(12) United States Patent
Tanzy

(10) Patent No.: US 8,489,644 B2
(45) Date of Patent: Jul. 16, 2013

(54) SYSTEM AND METHOD FOR MANAGING VIRTUAL TREE PAGES

(75) Inventor: Henry W. Tanzy, Atlanta, GA (US)

(73) Assignee: CA, Inc., Islandia, NY (US)

( * ) Notice: Subject to any disclaimer, the term of this patent is extended or adjusted under 35 U.S.C. 154(b) by 603 days.

(21) Appl. No.: 11/399,113

(22) Filed: Apr. 5, 2006

(65) Prior Publication Data

US 2007/0239733 A1 Oct. 11, 2007

(51) Int. Cl.
*G06F 7/00* (2006.01)
*G06F 17/30* (2006.01)

(52) U.S. Cl.
USPC ........................................................ 707/797

(58) Field of Classification Search
USPC ................. 707/3, 102, 10, 999.003, 999.102, 707/999.01, 797
See application file for complete search history.

(56) References Cited

U.S. PATENT DOCUMENTS

| | | | | |
|---|---|---|---|---|
| 5,546,529 | A * | 8/1996 | Bowers et al. | 715/848 |
| 6,380,957 | B1 * | 4/2002 | Banning | 715/828 |
| 6,385,654 | B1 * | 5/2002 | Tanaka | 709/231 |
| 6,448,985 | B1 * | 9/2002 | McNally | 715/784 |
| 6,636,845 | B2 * | 10/2003 | Chau et al. | 707/1 |
| 6,745,208 | B2 * | 6/2004 | Berg et al. | 1/1 |
| 6,785,673 | B1 * | 8/2004 | Fernandez et al. | 1/1 |
| 6,823,495 | B1 * | 11/2004 | Vedula et al. | 715/805 |
| 7,318,066 | B2 * | 1/2008 | Kaufman et al. | 707/102 |
| 2002/0083085 | A1 * | 6/2002 | Davis et al. | 707/204 |
| 2003/0126136 | A1 * | 7/2003 | Omoigui | 707/10 |
| 2007/0198473 | A1 * | 8/2007 | Carrier | 707/3 |

OTHER PUBLICATIONS

U.S. Appl. No. 11/399,011, entitled "*System and Method for Automated Construction, Retrieval and Display of Multiple Level Visual Indexes*", by Henry W. Tanzy, 17 pages including 10 pages of drawings.

* cited by examiner

*Primary Examiner* — Alexey Shmatov
(74) *Attorney, Agent, or Firm* — Baker Botts, LLP

(57) ABSTRACT

A method for processing a request to display data includes receiving at a virtual tree server a request to display data stored in a database. The data is associated with a selected node of a virtual tree structure. The method continues by loading node definition data in response to the request. The node definition data defines the selected node of the virtual tree structure and how the node is displayed. The method also includes saving the node definition data in a page file and transmitting the saved page file.

24 Claims, 10 Drawing Sheets

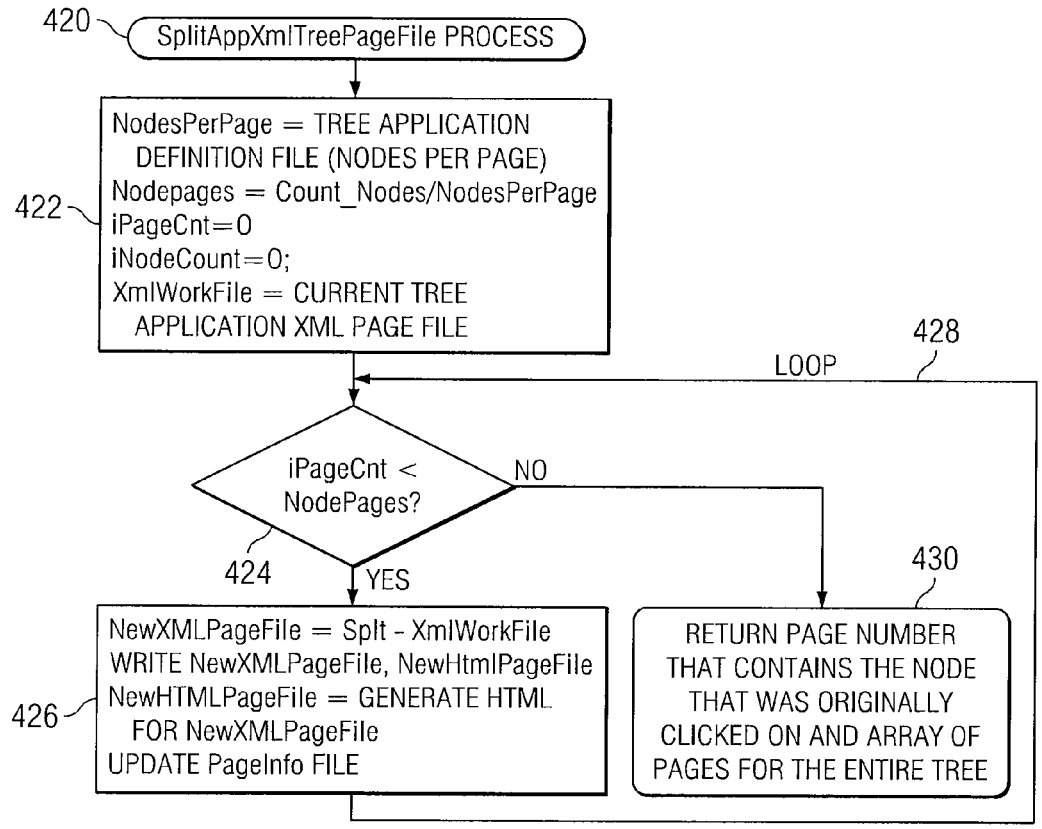
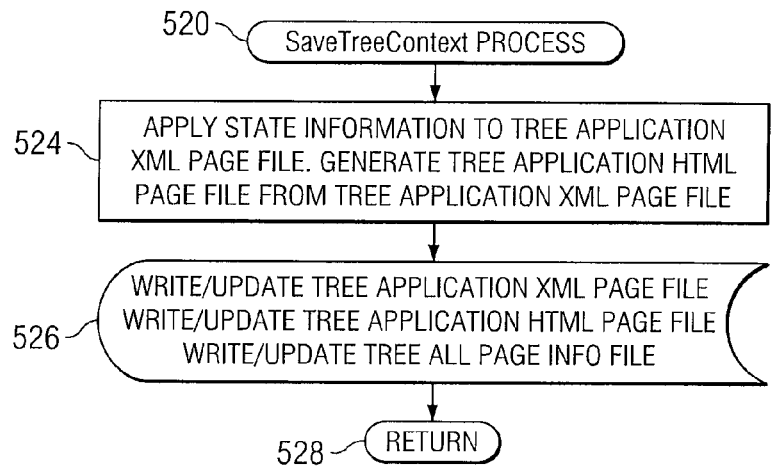

SYSTEM AND METHOD FOR MANAGING VIRTUAL TREE PAGES

TECHNICAL FIELD OF THE INVENTION

The invention relates generally to the field of data processing and display, and particularly to a system and method for the managing virtual tree pages.

BACKGROUND OF THE INVENTION

Historically, the contents of enterprise and other large databases have been displayed using so-called graphical tree interfaces in which nodes representing the contents of the database may be expanded or contracted by a simple point and click operation. Such interfaces offer an intuitive and powerful visual tool for navigating hierarchical and non-hierarchical data structures and allow the user to reach required application data after a relatively small number of point and click operations.

Web-based applications, however, cannot effectively display graphical tree structures with large numbers of nodes. For example, a client browser attempting to display a tree node and its 10,000 child nodes would take several minutes to render the nodes and related images and risk running out of available memory before the tree structure could be completed. Accordingly, those Web applications that have implemented graphical tree structures which uses a Web console tree for managing database servers, which uses a tree to manage inboxes, outboxes and public folders, and various Web based help facilities, and which use trees to display static help content, are all unable to efficiently manage and display the contents of enterprise and other large databases. This has led developers to implement the search/filter/results approach favored by Internet search engines, in which the user fills in search terms in various filter fields on the browser and the server returns a number of results pages that are displayed one at a time. However, because a user typically executes several queries in order to establish filter criteria that return an appropriate number of pages, using this approach, network resources are burdened and the rate at which the server can manage transactions is reduced. Furthermore, abandoning pre-existing tree structures greatly complicates the development of Web applications.

SUMMARY OF THE INVENTION

In view of the problems and shortcomings associated with implementing graphical tree structures in client server applications, the invention herein disclosed is a system and method for displaying on a client the contents of a database as a graphical tree structure. One embodiment of the disclosed method and system is based on a virtual tree server that is configured to receive a request from a client to display data from the database associated with a node selected by a user on the client. In this embodiment, in response to the request, data defining the selected node and how it is to be displayed is loaded and saved in a page file that is then transmitted to the client, enabling the data for that node to be displayed on a browser of the client.

In another embodiment, the node definition data is a graphical representation of the node and the page file is an XML file. In yet another embodiment, the saved page is transmitted to the client in response to subsequent requests to display the data associated with the selected node. In still another embodiment, the page files that exceed a threshold size are split into one page file corresponding to the selected node and one or more excess page files. In a further embodiment, the database is a relational database.

Another object of the present invention is to provide a series of tools for developers enabling the construction, display, navigation and state maintenance of a virtual graphical tree-based structure representing a database located on a server across either the Internet or a corporate intranet.

Various embodiments of the present invention may benefit from numerous advantages. It should be noted that one or more embodiments may benefit from some, none, or all of the advantages discussed below. The system and method described herein has the advantage over conventional Web applications that employ a graphical tree structure of being able to efficiently display the contents of large databases on a client. The virtual tree server offers further advantages over the conventional search/filter/results approach of Internet search engines; namely, an intuitive user interface, more efficient use of network and server resources and greater ease of application development.

BRIEF DESCRIPTION OF THE DRAWINGS

For a more complete understanding of the present invention and its advantages, reference is now made to the following description, taken in conjunction with the accompanying drawings, in which:

FIG. 8 is a flow diagram showing a SplitAppXmlTreePageFile process whereby the Virtual Tree Server manages an HTML tree that exceeds an application-defined threshold;

FIG. 9 is a flow diagram showing a SaveTreeContext process whereby the Virtual Tree Server responds to a request to save user-specific interface state information such as horizontal and vertical scroll positions, tree node visibility (i.e., expansions and contractions) and node selection or nonselection.

Throughout the Figures, the same reference numerals and characters, unless otherwise stated, are used to denote like features, elements, components or portions of the illustrated embodiments.

DETAILED DESCRIPTION OF EXAMPLE EMBODIMENTS OF THE INVENTION

Figure 1:
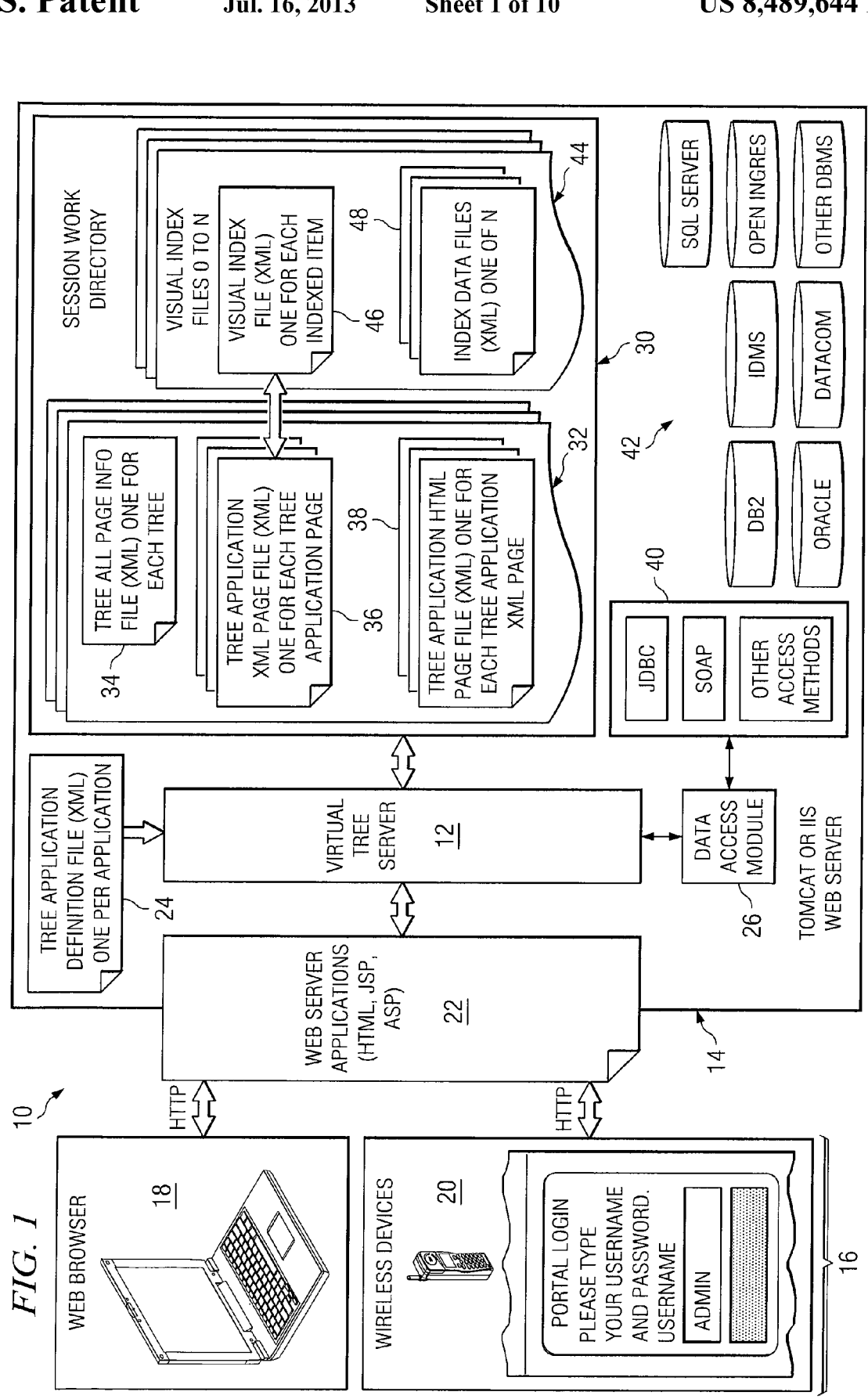
FIG. 1 illustrates a system architecture that includes a Virtual Tree Server according to one embodiment of the present invention.

FIG. 1 illustrates a system architecture 10 that includes a Virtual Tree Server 12. Though Virtual Tree Server 12 and other elements of system 10 are illustrated as being implemented on a Tomcat or IIS Web Server 14, one skilled in the art will appreciate that these elements may be implemented using other Web-server types. The user of client 16 sends a request associated with the display of a Web page containing a graphical tree structure to a Web Server application 22 running Hypertext Markup Language ("HTML"), Java Server Pages ("JSP") or Active Server Pages ("ASP"). The client's request, in Hypertext Transfer Protocol ("HTTP"), may be to display a new graphical tree structure, to expand or contract a node in an existing tree structure, or to save the tree context—i.e., how the nodes have been expanded and/or contracted by the user—for later retrieval. In accordance with the client's request, Web Server application 22 issues a request to the Virtual Tree Server 12 to either (1) create, (2) expand or contract or (3) save the virtual graphical tree structure.

When the request from Web Server application 22 is received by Virtual Tree Server 22, Virtual Tree Server 22 contacts Tree Application Definition File 24 for instructions regarding how the modified graphical tree structure is to be displayed. Each Web Server application 22 is associated with a Tree Application Definition File 24 detailing how the nodes will appear on the tree for that application, how these nodes will be expanded (i.e., whether a node will be expanded to display a number of child nodes or application data), how particular leaf nodes will be populated with application data (i.e., how Data Access Module 26 will access the data) and how the graphical tree structure will appear to the user (i.e., the threshold number of nodes that will be displayed at one time). A node that is expanded to display application data, as opposed to further child nodes, is termed a leaf node. As explained in more detail below, based on instructions received from the Tree Definition File 24, Virtual Tree Server 12 uses XML and HTML files that are stored in Session Work Directory 30 to create HTTP instructions appropriate for displaying a modified graphical tree structure, populated as needed with application data obtained via Data Access Module 26. Further, taking account of the threshold number of nodes that may be displayed per page, the Virtual Tree Server 12 may split a graphical tree structure into two or more pages, before transmitting HTTP instructions to client 16 where one of these pages is to be displayed.

Each time a graphical tree structure is displayed on client 16, a new Session Work Directory 30 is created. Within Session Work Directory 30, the XML and HTML files used to create and display the graphical tree structure are located within block 32. A Tree All Page Info File 34 (one for each tree) contains the information needed to create new tree nodes using Tree App XML Page File 36. In turn, Tree App XML Page File 36 contains the HTML elements needed to display a graphical tree page and manage the expansion of the tree nodes for a given tree page image by generating a corresponding Tree App HTML Page File 38. When the size of the Tree App XML Page File 36 exceeds the page split threshold, as defined in the Tree Application Definition File 24, the Tree App XML Page File 36 is split into two or more pages, giving two or more Tree App HTML Page Files 38.

As noted above, the Virtual Tree Server 12 uses a Data Access Module 26 to make requests to populate expanded leaf nodes within the tree with application data. These requests may be made using a number of methods shown schematically in block 40, including Java Database Connectivity ("JDBC") and Simple Object Access Protocol ("SOAP"). The nodes of the virtual tree may be populated using data extracted via these requests from any of a number of database sources, including IBM's DB2 or Computer Associate's IDMS databases, as shown schematically in block 42.

Client 16 can be any suitable local or remote end-user device that may be used to access one or more elements of system 10. A particular client 16 may comprise a computer, workstation, telephone, browser 18, electronic notebook, Personal Digital Assistant (PDA), pager, wireless device 20, or any other suitable device (wireless or otherwise), component, or element capable of receiving, processing, storing, and/or communicating information with other components of system 10.

It should be understood that all of the elements of system 10 described above may be arranged in any suitable manner to perform the functions described herein. For example, the elements may be arranged in a client-server architecture. Moreover, one or more processors and memory may be used to implement the functions associated with server 14 and its components. Furthermore, while particular components of server 14 are illustrated as separate elements, one or more components of server 14 may be arranged in any suitable number and combination of modules to perform the recited functions.

Figure 2:
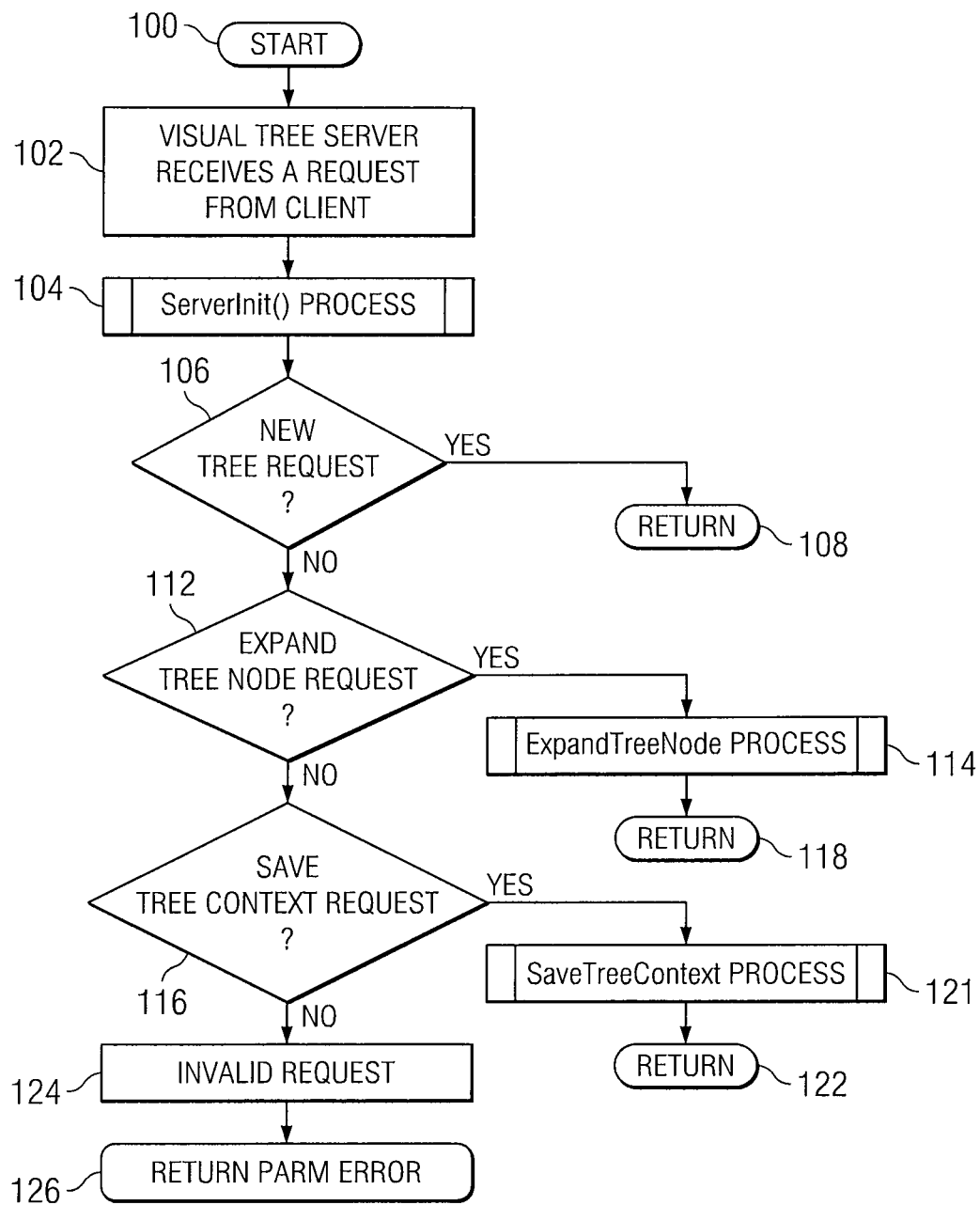
FIG. 2 is a flow diagram showing a process whereby client requests are managed and routed at an entry point of the Virtual Tree Server.

FIG. 2 shows a flow chart for implementing an embodiment of the method for managing client's requests to (1) create a new tree node, (2) expand a tree node and (3) save a tree context. (Contracting a previously expanded tree node is generally a simpler process and will not be discussed). Client 16 starts the process by sending a request to display a page containing a virtual tree index. The client's request is received at 102 by the Virtual Tree Server 12. The ServerInit process 104 is then invoked to perform necessary housekeeping chores common to all client requests, as described in more detail below with reference to FIG. 3. The client request type—(1) create a new tree, (2) expand a tree node or (3) save a tree context—is then determined according to blocks 106, 112, and 116. If at 106, it is determined that the request type is a "New Tree Request," control is returned to the Client Web Browser at step 108 together with a request to view Tree App HTML Page 38. As explained below with reference to FIG. 3, the "New Tree Request" is actually processed in the ServerInit Process 104. On the other hand, if the request type is not a "New Tree Request," then an inquiry is performed at 112 to determine whether the request is to expand a tree node.

Figure 5:
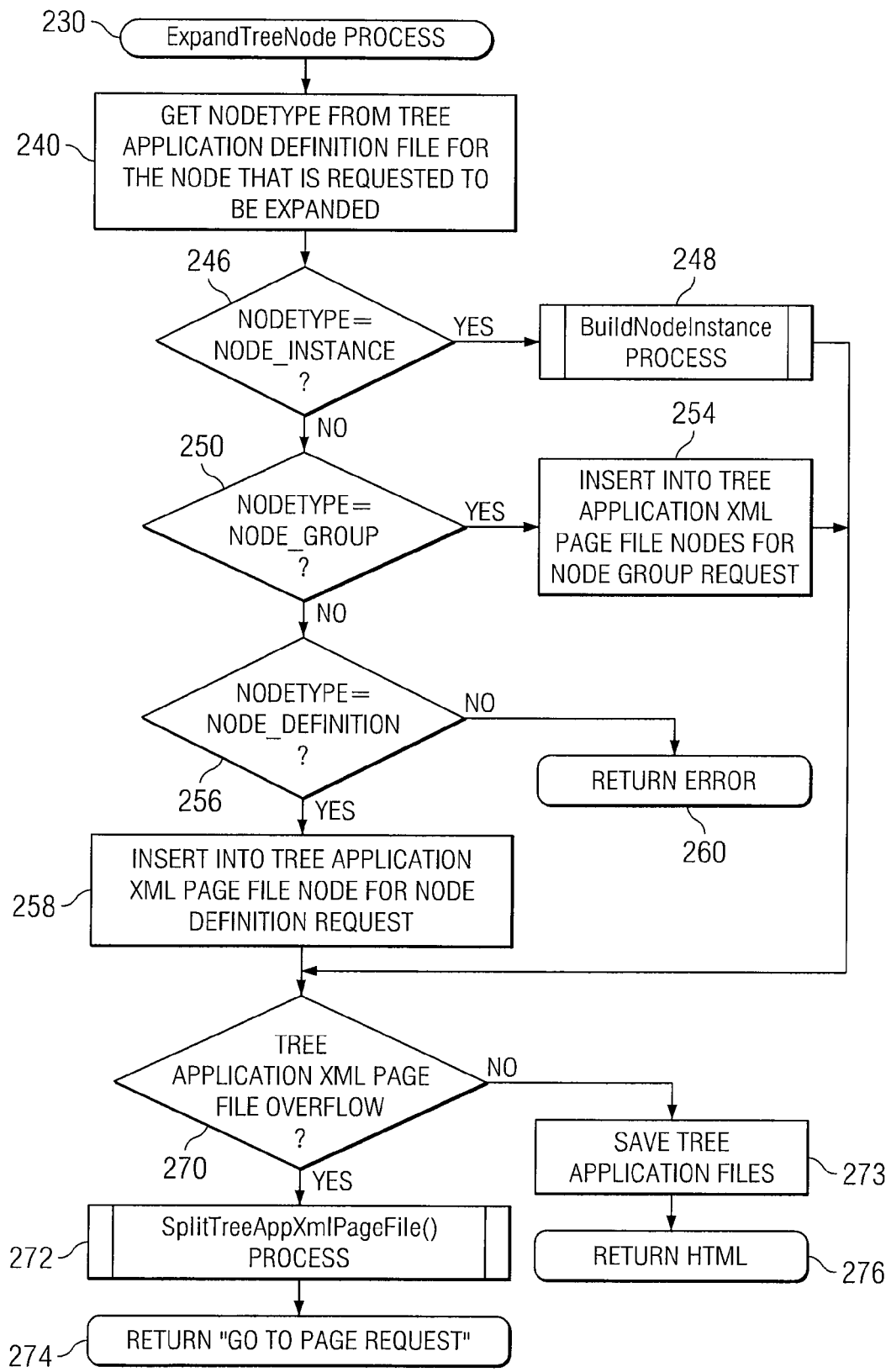
FIG. 5 is a flow diagram showing an ExpandTreeNode process whereby requests to expand tree nodes are handled.

If it is determined at 112 that the client has requested an expansion of a tree node, ExpandTreeNode process 114, which is described in more detail below with reference to FIG. 5, is executed. Upon completion of the ExpandTreeNode process 114, control is returned to the Client Web Browser at 118 together with a request to display a specific Tree App HTML page 38 or buffer that contains the HTML text to be inserted into the browser tree. On the other hand, if at 112 it is determined that the client has not requested an expansion of a tree node, then an inquiry is performed at 116 to determine whether the client has issued a request is to save the current tree.

If at 116, it is determined that the client has requested that the tree be saved, then the SaveTreeContext process 121, which is described in detail below with reference to FIG. 9, is executed. Upon completion of the SaveTreeContext process 121, control is returned to the client 122 at 122. On the other hand, if it is determined at 116 that the client has not requested that the tree be saved, at step 124 it is determined that the client request has not been recognized and error text is written to the system log file and an error condition is returned to the client at 126.

Figure 3:
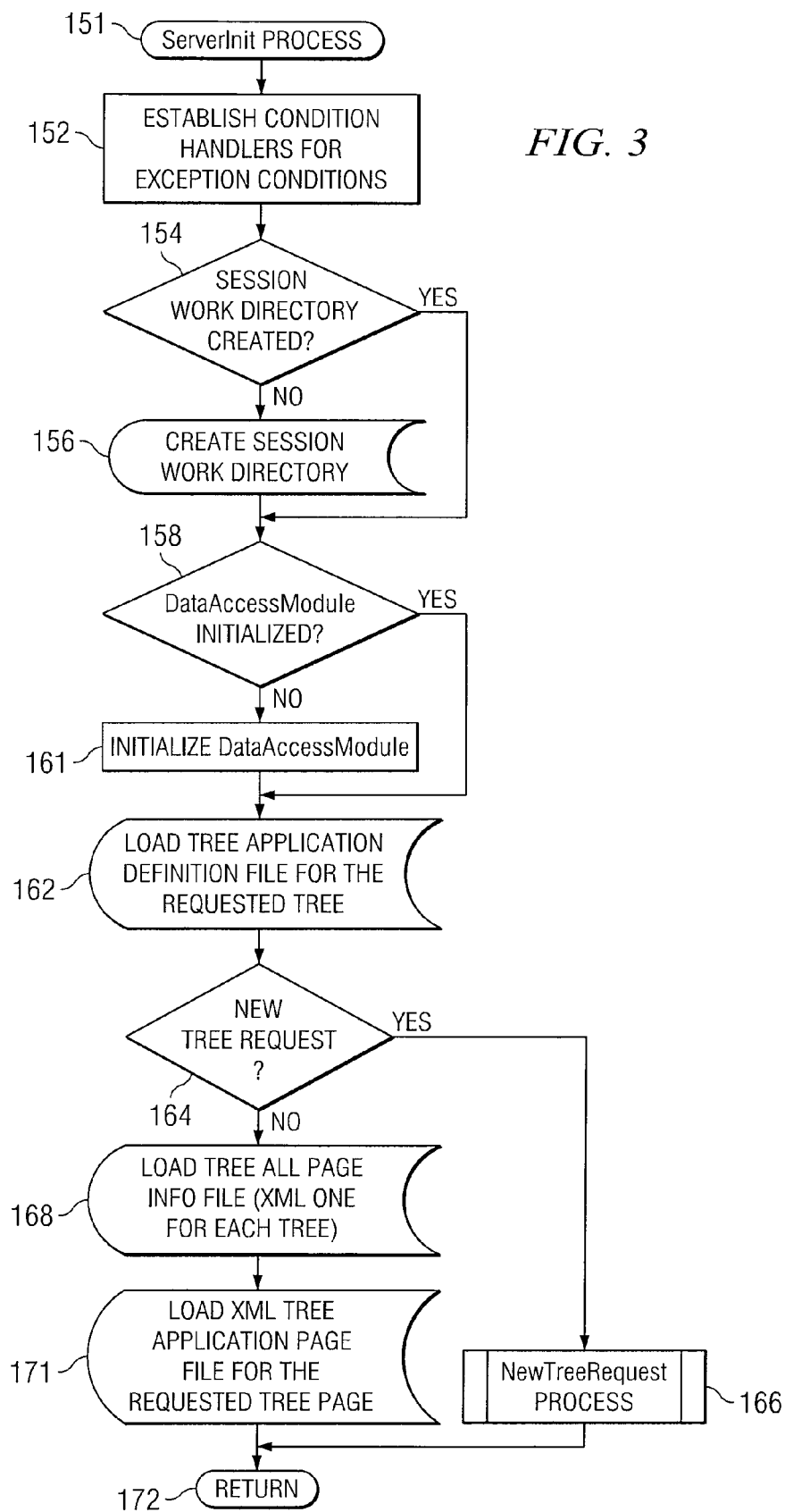
FIG. 3 is a flow diagram showing a ServerInit process whereby the process logic common to server requests is handled.

FIG. 3 shows the detailed operation of the ServerInitProcess 104 discussed above with reference to FIG. 2. The process is initiated at step 151, and, at step 152, condition handlers are established for exception conditions that may be recognized within the Virtual Tree Server 12. A determination is then made, at step 154, whether a Session Work Directory 30 has been created for the client. The Session Work Directory 30, as noted above, stores all of the HTML and XML files related to trees. If no Session Work Directory 30 has been created, a Session Work Directory 30 is created at step 156. Once a Session Work Directory 30 has been established, at step 158, a determination is made as to whether or not the Data Access Module 26 has been initialized. If the Data Access Module 26 has not been initialized, it is initialized at 161. Then, at 162, the Tree Application Definition File 24, for the requested tree is loaded. The Tree Application Definition File 24 is application-specific and details the nodes that will appear on a tree, how these nodes will be populated—i.e., via data calls to the Data Access Module, 26, which requests may be executed in Structured Query Language ("SQL")—and which context menus and actions are associated with a node.

Figure 4:
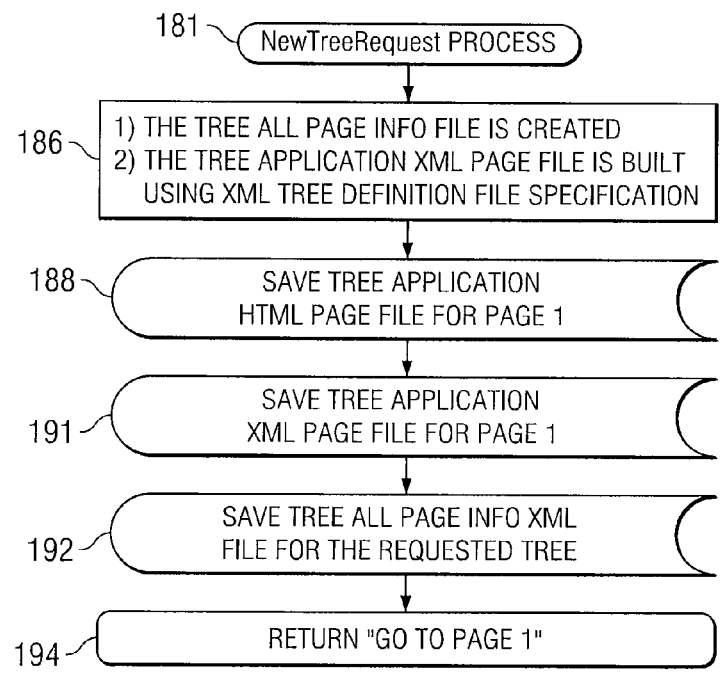
FIG. 4 is a flow diagram showing a NewTreeRequest process whereby tree data structures and new tree files are built.

At 164, a determination is made whether or not the request is a request for a new tree. If the answer of this inquiry is yes, then the NewTreeRequest process, which is described in detail below with reference to FIG. 4, is called at 166. On the other hand, if the answer to inquiry 164 is that the request is not a new tree request, then the Tree All Page Info File 34, is loaded and executed at 168. As discussed above, for each application tree there is a corresponding Tree All Page Info File 34. This file is used to keep track of the identity of the next available node that may be assigned and the page array that keeps track of which tree pages will link to each other in the event that multiple pages need to be created. After the Tree All Page Info File 34 has been loaded at step 168, the Tree App XML File 36 for the requested tree is loaded at step 171, following the client browser application request that a node within a specific page be loaded or that the context state associated with a specific page be requested. At step 172, the ServerInit process 104 returns control to the calling program It should be noted that, regardless of the type of request made by the user to the Virtual Tree Server 12, once the ServerInit process 104 has been completed, the following parsed XML documents will be available in memory to be accessed and/or updated: (1) the Tree Application Definition File 24, (2) the Tree All Page Definition File 34, and (3) the Tree App HTML Page File 38.

FIG. 4 shows the NewTreeRequest process, shown as step 166 in FIG. 3, in which process the tree data structures and files for a new tree are initially built. At step 186, the NewTreeRequest process creates the Tree All App Page Info File 34. As discussed above, the Tree All Page Info File 34 identifies and tracks the next tree node to be created and stores the page navigation array, which in turn identifies the order of the Tree App HTML Page File 36 after the Tree App XML Page File 28 has been split into two or more separate pages. The Tree App XML Page File 36 stores the nodes associated with a specific tree page and, as discussed below, is updated by the Virtual Tree Server 12 and, before control is returned to the client, saved to disk, enabling HTML page files to be easily created from the stored file.

At step 188, the page one Tree App HTML Page File 38 is saved to disk, having been created by extracting the tree page from the Tree App XML Page File 36. Next, at step 191, the page one Tree App XML Page File 36 is saved to disk. Then, at step 192, the Tree All Page Info File 34 is saved to disk. Finally, at step 194, the process is terminated with a request sent to the client Web browser to request the loading of page one of the Tree App HTML Page File 38.

FIG. 5 shows the ExpandTreeNode process, shown as step 114 in FIG. 2, which manages the expansion of an individual tree node. The process begins at step 230 with the receipt of the expand tree node request. Next, at step 240, the node type of the requested node (target node) is retrieved from the Tree Application Definition File 24. There are at least three possible node types—"NODE_INSTANCE", "NODE_GROUP" and "NODE_DEFINITION"—that are used within the Tree Application Definition File 24. While the Tree Application Definition File 24 defines the hierarchy of nodes within an application tree, what the nodes will look like and how the nodes will be built, the type of node will determine what action the Virtual Tree Sever 12, will take when the node's parent is clicked on. When a node is clicked by the user, another property within the node element, the instance property, will dictate how the Virtual Tree Server 12 will act. Accordingly, the following three simple types control how a tree is expanded: NODE_DEFINTION—Instructs the Virtual Tree Server 12 to build a node with an Image Icon and text string; NODE_INSTANCE—Instructs the Virtual Tree Server 12 to build child nodes for the current parent based on a SQL Query; and, NODE_GROUP—Instructs the Virtual Tree Server 12 to build children for the current parent based on a list of nodes. These instance elements will point to nodes that have a type of NODE_DEFINTION. By way of illustration, a simple tree might have the XML definition:

```
<root>
    <tree id="proto" root="segment" appTitle="Proto Tree">
        <node id="segment" type="NODE_DEFINITION" instance="segment_i" NameI18="Segments ">
        </node>
        <node id="segment_i" type="NODE_INSTANCE" group="y" instance="segment_g">
            <sql propertyName="segment">
              Select distinct *
                from system.segment where name is not null order by name
            </sql>
            <save_keys>SEGMENT.NAME|SEGMENT.CUSER</save_keys>
        </node>
        <node id="segment_g" type="NODE_GROUP" instance="instance">
            <instance name="file"/>
            <instance name="area"/>
            <instance name="dmcl_including_segment"/>
            <instance name="dbname_including_segment"/>
            <instance name="schema_referencing_segment"/>
            <instance name="grantee_for_segment"/>
            <instance name="no_index_example"/>
            <instance name="index_example"/>
        </node>
        <node id="file" type="NODE_DEFINITION" instance="file_i" ui="demo"
            NameI18="File" icon="img/FolderOpenTest.gif">
```

```
        </node>
        <node id="file_i" type="NODE_INSTANCE" leaf="y" icon="img/FolderOpenTest.gif">
            <sql propertyName="file">
                select distinct NAME, CTIME, UTIME, CUSER, BLOCKSIZE, DDNAME, DSNAME, DISP
                    from SYSTEM.FILE where SEGMENT = ':SEGMENT.name'
            </sql>
        </node>
        <node id="area" type="NODE_DEFINITION" instance="area_i" ui="demo" NameI18="Area">
        </node>
        <node id="area_i" type="NODE_INSTANCE" leaf="y">
            <sql propertyName="area">
                select distinct NAME, CTIME, UTIME, CUSER, UUSER, LOWPAGE
                    from SYSTEM.AREA where SEGMENT = ':SEGMENT.name'
            </sql>
        </node>
        <node id="dmcl_including_segment" type="NODE_DEFINITION" instance="dmcl_including_segment_i"
              ui="demo" NameI18="Dmcl including Segment">
        </node>
        <node id="dmcl_including_segment_i" type="NODE_INSTANCE" leaf="y">
            <sql propertyName="segment">
                Select distinct *
                    from system.segment where name is not null order by name
            </sql>
        </node>
        ...
    </tree>
</root>
```

As shown in FIG. 5, at step 246, a determination is made whether or not the node type is NODE-INSTANCE. If the node type is determined to be NODE_INSTANCE, the BuildNodeInstance process, described in more detail below with reference to FIG. 6, which handles the expansion of instance nodes, is invoked at step 248. Upon completion of the BuildNodeInstance process, the in memory Tree App XML page file 36 will contain XML nodes representing the child nodes added to the tree, which nodes contain HTML content. The Tree App XML page file 36, when saved as HTML can be viewed as a graphical tree on a client browser. Next, at step 270, a test is performed to determine whether the tree overflow condition applies, as explained in more detail below.

If on the other hand, at step 246, the node type is determined not to be NODE_INSTANCE, a test is performed at step 250 to determine whether the node type is NODE_GROUP. If at step 254, the node type is determined to be NODE_GROUP, the XML representation for node groups is constructed, the Tree Application Definition File 24, accessed and all of the nodes in the node group retrieved. The NODE_GROUP type is a set of 1 to N nodes that have a type of NODE_DEFINITION. Accordingly, at step 254, a child tree node for each node within the group, which child node is inserted into the Tree App XML page file 36, as a child of the target node. The process then moves to step 270, where a test is performed to determine whether the tree overflow condition applies, as explained in more detail below.

If on the other hand, at step 250, the node type is determined not to be NODE_GROUP, a test is performed at step 256 to determine whether the node type is NODE_DEFINITION. If at step 256, the node type is determined to be NODE_DEFINITION, the XML/HTML representation of the node is constructed at step 258 and inserted into the Tree App XML Page file 36. The process then moves to step 270, where a test is performed to determine whether the tree overflow condition applies, as explained in more detail below. On the other hand, if at step 256 the node type is determined not to be NODE_DEFINITION, then an error condition exists and step 260 is performed to return an error condition.

As noted above, the Tree App XML Page File Overflow Condition is tested at step 270. The condition checks to determine whether the number of nodes for the in memory Tree App XML Page file 36, exceeds a threshold defined in the Tree Application Definition File 24. If at step 270, the threshold is determined to have been exceeded, at step 273 the Tree All Page Info File 34, and the current Tree App XML Page file 36, is written to disk. The Tree App HTML Page File 186, does not need to be generated in this example since no page split has occurred. Finally, at step 276, the expanded nodes, formatted as HTML, are returned to the client browser to be viewed as graphical tree nodes. The HTML that represents a graphical view of the tree being actually contained within the XML files in the Tree App XML Page file 36.

On the other hand, if at step 270 the threshold is determined to have been exceeded, then the SplitTreeAppXMLPageFile process is invoked at 272. This process, described below in detail with reference to FIG. 8, divides the current Tree App XML Page File 36, into one or more files and saves representations of each XML page file as HTML pages that may be requested by the client. Finally, at step 274, the URL for the HTML page that contains the node that was clicked on by the user will be returned to the client browser to be displayed.

Figure 6:
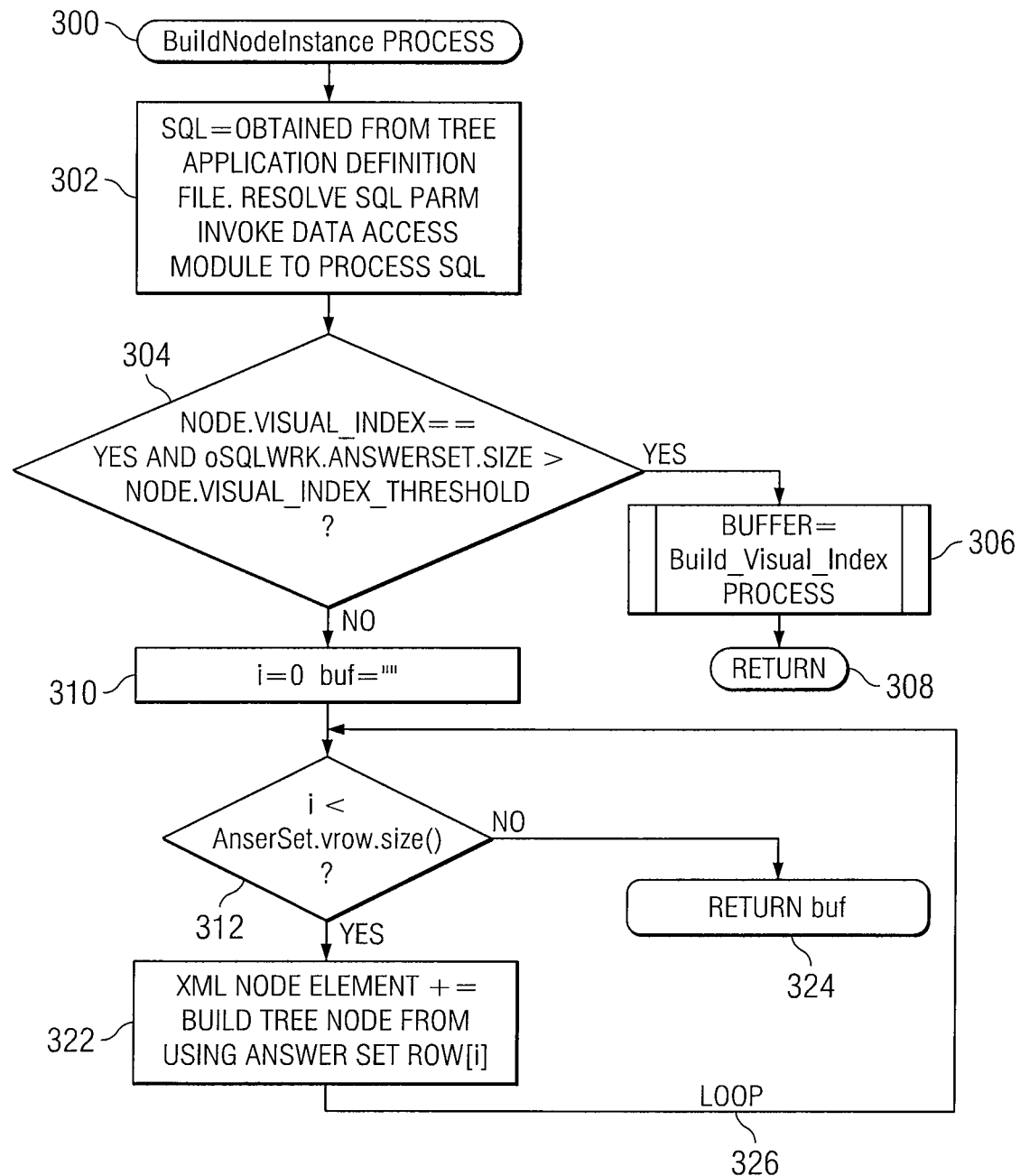
FIG. 6 is a flow diagram showing a BuildNodeInstance process whereby the definitions of externally defined node structures are loaded and tree nodes are constructed.

FIG. 6 shows the steps of the BuildNodeInstance process, shown as step 248 in FIG. 5, in which nodes of type NODE_DEFINITION, having been clicked on by the user of the Web browser, have their instances constructed. The process begins at step 300, with the receipt of the build node instance request. At step 302, SQL is obtained for the NODE-INSTANCE type from the Tree Application Definition File 24, any SQL parameters are resolved and the Data Access Module 26 is invoked to process the SQL and return an answer set of 0 to N rows, where N is a positive whole number.

Figure 7:
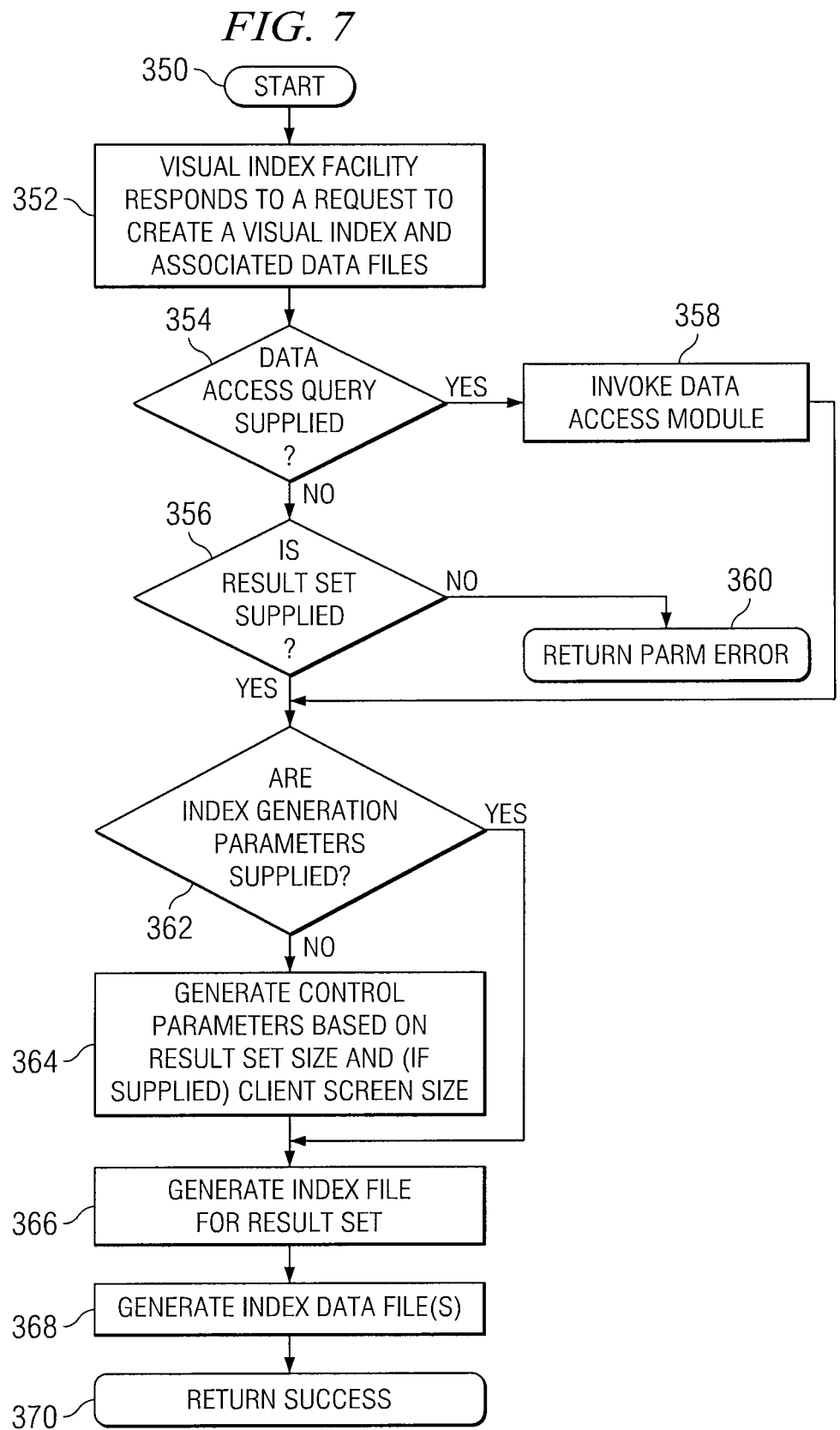
FIG. 7 is a flow diagram showing a process whereby a VisualIndex is created.

At step 304, a determination is made regarding whether or not the current node has the properties of a visual index. If at step 304, it is determined that the current node has the properties of a visual index and the SQLWrk.ANSWERSET.SIZE( ) exceeds the visual index threshold for the node, then at step 306, the BuildVisual Index process, is invoked. FIG. 7 shows the steps of the Build Visual Index process referred by step 306 of FIG. 6, by which virtual indices for a Virtual Tree are constructed. Upon completion of step 306, i.e., upon construction of the appropriate visual indices, control is returned to the calling process at step 308.

On the other hand, if at step 304, it is determined that the target node is not defined as a candidate for the use of visual indices, or the target node is defined as a candidate for the use of visual indices but does not exceed the visual index threshold noted above, then processing continues at step 310. At step 310, various control switches are set, in preparation for processing of the SQL answer set. Next, at step 312, a determination is made regarding whether any answer set rows remain unprocessed. If the answer to this inquiry is "yes," then at step 322 the answer row is formatted as an XML tree node and inserted into the in memory representation of the Tree App XML Page file 36. Next, the process is returned via a loop 326 to step 312, where the determination is again made regarding whether any answer set rows remain unprocessed. These steps are repeated until it is determined at 312 that no answer set rows remain to be processed. In other words, once the result of the determination at 312 is "no", then the loop is terminated and step 324 returns control to the caller of the BuildNodeInstance routine.

FIG. 7 illustrates one embodiment of a flow diagram for implementing a method for creating a visual index and associated data files in response to a client request. The method starts at 350 and proceeds to step 352 where the visual index facility responds to a request to create a visual index and associated data files. At block 354, a determination is made whether a data access query (i.e., a query for creating a sorted result set from the database contents) has been supplied. If such a query has been supplied, at block 358, the data access module is invoked and an industry standard access method/protocol is used to create a sorted result set. Examples of such standard access methods/protocols include the Java Database Connectivity ("JDBC") and the Simple Object Access Protocol ("SOAP"), though other access methods may be employed.

If it is determined, at block 354, that no data access query was supplied, then a determination is made, at block 356, whether or not a sorted result set has separately been supplied. (The user may have run their own access routines to create a sorted result set.) If no such result set was supplied, then the method returns an error condition at block 360.

Once it has been determined that a sorted result set is available—either supplied by the user or generated by the data access module 26—a further determination is made, at block 362, whether index generation parameters have been supplied by the user. If no index generation parameters have been supplied, at block 364, they are generated based on the size of the result set and, if known, the client's screen size. In one embodiment, the parameter generation algorithm is biased to produce depths corresponding to approximately two thirds of the client's screen size, minimizing the need for the user to scroll when selecting indexes for expansion.

Once control parameters (index generation parameters) have been established, at block 366, a routine is called to generate the index file based on the current result set size. Next, at block 368, a routine is called to generate the data file(s) associated with the index file. Finally, at block 370, the method returns a "success" status.

FIG. 8 shows the steps of the SplitTreePageFile process, shown as step 272 in FIG. 5, which is invoked once it has been determined that the number of nodes in the current Tree App XML Page file 36, exceeds an application-defined threshold. The process begins at step 420, with the receipt of the split page tree file request. Next, at step 422, variables that control the page split process are accessed from the Tree Application Definition File 24: NodesPerPage determines the optimum number of nodes for each page that is split; Node Pages determines the number of pages that the current Tree App XML Page file 36, will be split into; iPageCnt is set to zero; "I" is used to keep track of when the current XML page file has been split into NodePages; and XML WorkFile is set to the current XML page file to be split.

Next, at step 424, a determination is made whether the iPageCnt variable is less than the Node Pages variable. If the iPageCnt variable is less than the Node Pages variable, then the XML WorkFile has not been split into the desired number of pages and step 426 is performed, in which the XML WorkFile is split based on the NodesPerPage variable to generate a new page. During the actual page split, logic is invoked to ensure that the page split likely occurs on a parent node. For example, if a parent has fifty children, and the page split would otherwise occur at the tenth child node, using this logic, the page split is set to occur at the parent node. Also at step 426, the Tree App XML Page file 36, and a corresponding HTML page file 38, are written to disk. Finally, at step 426, the Tree All Page Info File 34, is updated to reflect the total number of pages in the application and to include a map showing which pages point one to the other. Next, the process is returned via a loop 428 to step 424, where a new determination is made by comparing the iPageCnt and Node Pages variables to see whether page splitting should continue. These steps are repeated until it is determined at 424 that no further page splitting is necessary. In other words, once the result of the determination at 424 is "no," then the loop is terminated and step 430 returns to the caller at the page that contains the node that was originally clicked on by the user together with an array that reflects which pages point one to the other.

FIG. 9 shows the steps of the SaveTreeContext process, shown as step 121 in FIG. 2, by which the tree context information for the requested page is saved. The process begins at step 520, and proceeds with the loading of the XML Page file that corresponds to the requested page. Next, at block 524, context information, passed from the client, is saved in a hidden field located in the Tree App XML page file 36. The context information includes the following property fields associated with each tree node: (1) Leaf Indicator—if "true" then that the node cannot be expanded; (2) Expansion Indicator—whether the tree server has been called to expand or contract the tree node; (3) ChildrenVisible Indicator—whether children of the node are visible, with the default value for nodes that have not been expanded being "false"; and (4) Selection indicator—whether the node has been selected. The context information further includes the following property fields associated with each tree: (1) horizontal and vertical scroll bar information; (2) Node ID of the selected node—null if no node is selected, and (3) Array of nodes that have the ChildVisible Indicator set. At step 524, the array of nodes having the ChildrenVisible Indicator set is applied to the XML page file and, if a tree contains a selected node, then this node is updated with an XML file. At this point in the process, the XML tree page elements are identical with the tree elements within the client Web browser. Also at step 524, the tree pages are extracted, and used to build the tree portion of the HTML page file, and the horizontal and vertical scroll bar locations are saved in a hidden field within the HTML page file. Finally, at step 524, the PageInfo file is updated with the current page number. At step 526, the XML/Page File, HTML/Page File and AllPageInfo files (34-38 in FIG. 1) are updated/written and at step 528, control is returned to the calling routine.

Figure 10B:
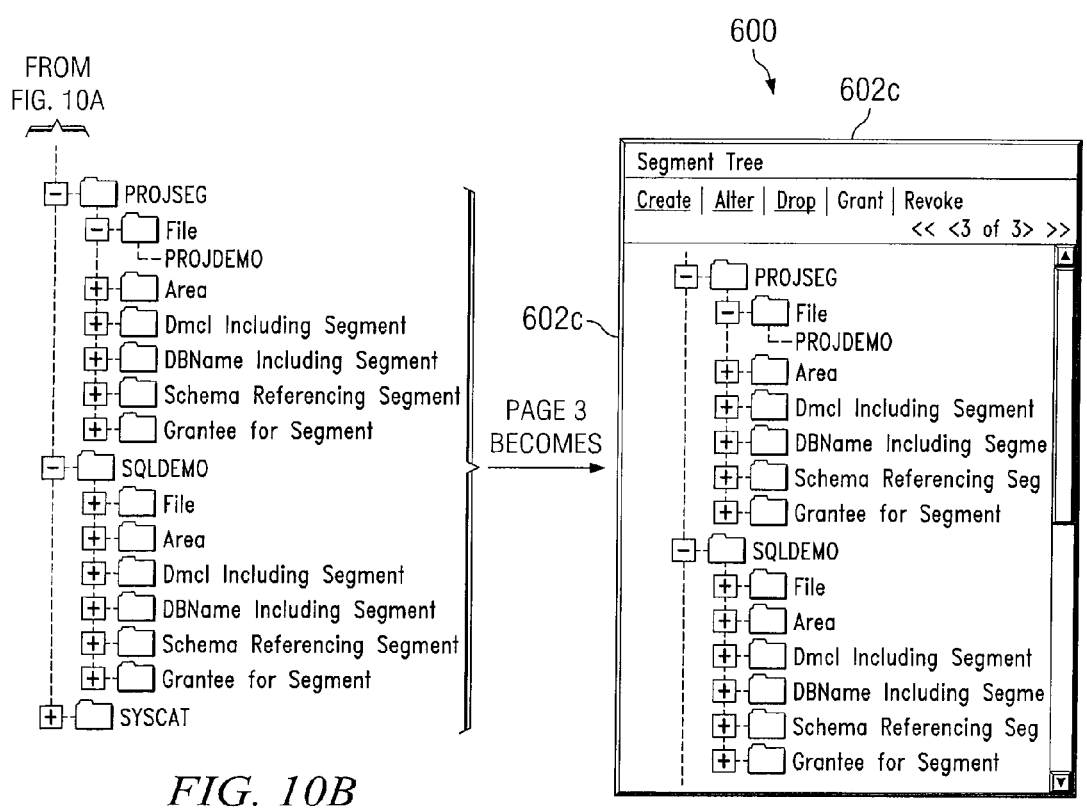
FIGS. 10 and 11 are examples showing a Virtual Tree Browser-based interface.
Figure 10A:
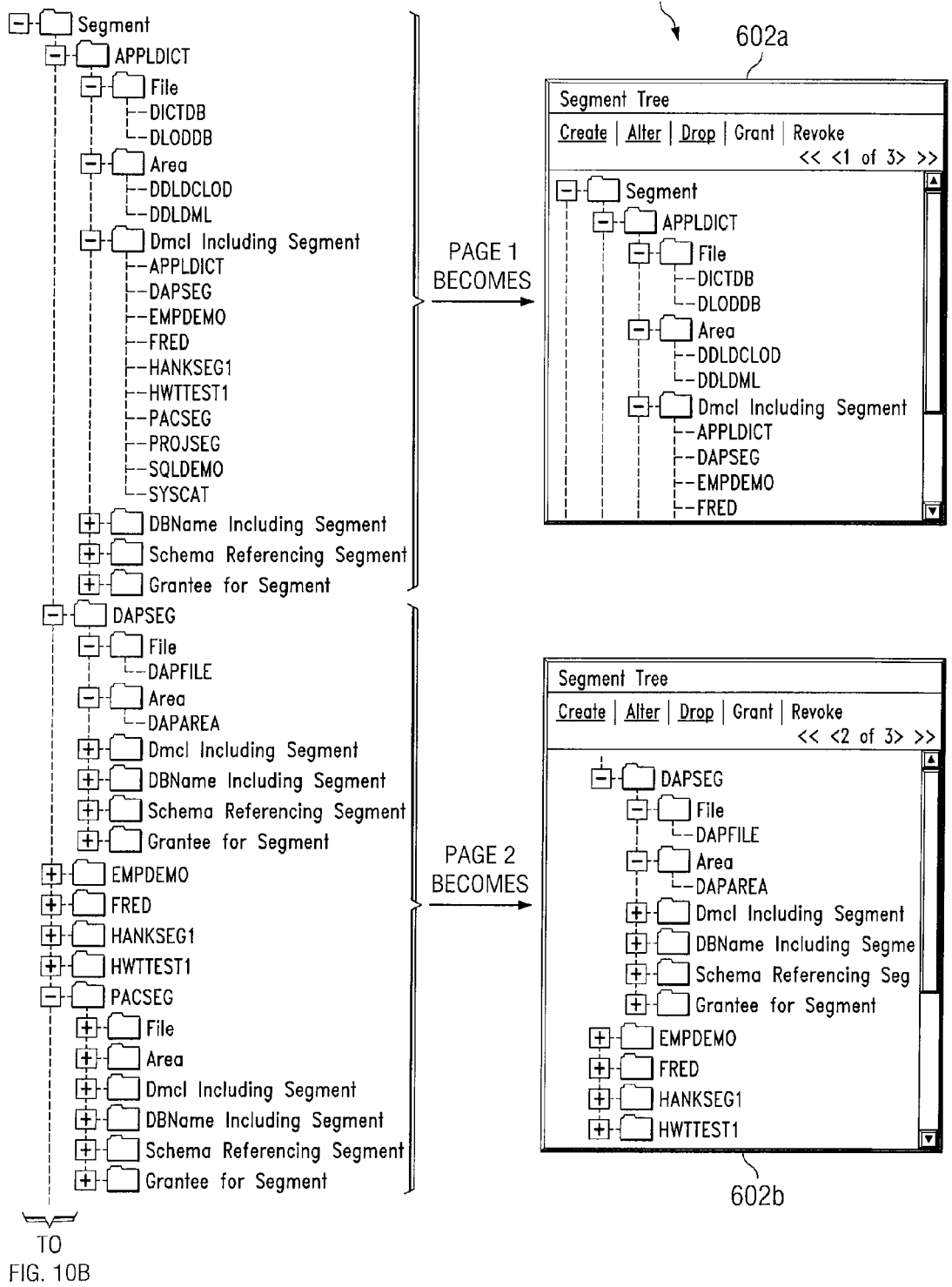

FIG. 10 is an example of a user interface implementing the present invention and shows how a Virtual Tree Interface provides a mechanism to view portions of a tree on separate pages as if each page were connected. In this example, a tree 600 containing fifty-eight nodes is split into three separate pages—Page 1 referred to as 602*a*, Page 2 referred to as 602*b*, and Page 3 referred to as 602*c*—each having sufficient space reserved for future growth (20 nodes in this example) and beginning where the previous page left off. The Virtual Tree Server 12 will divide pages on parent boundaries.

Figure 11:
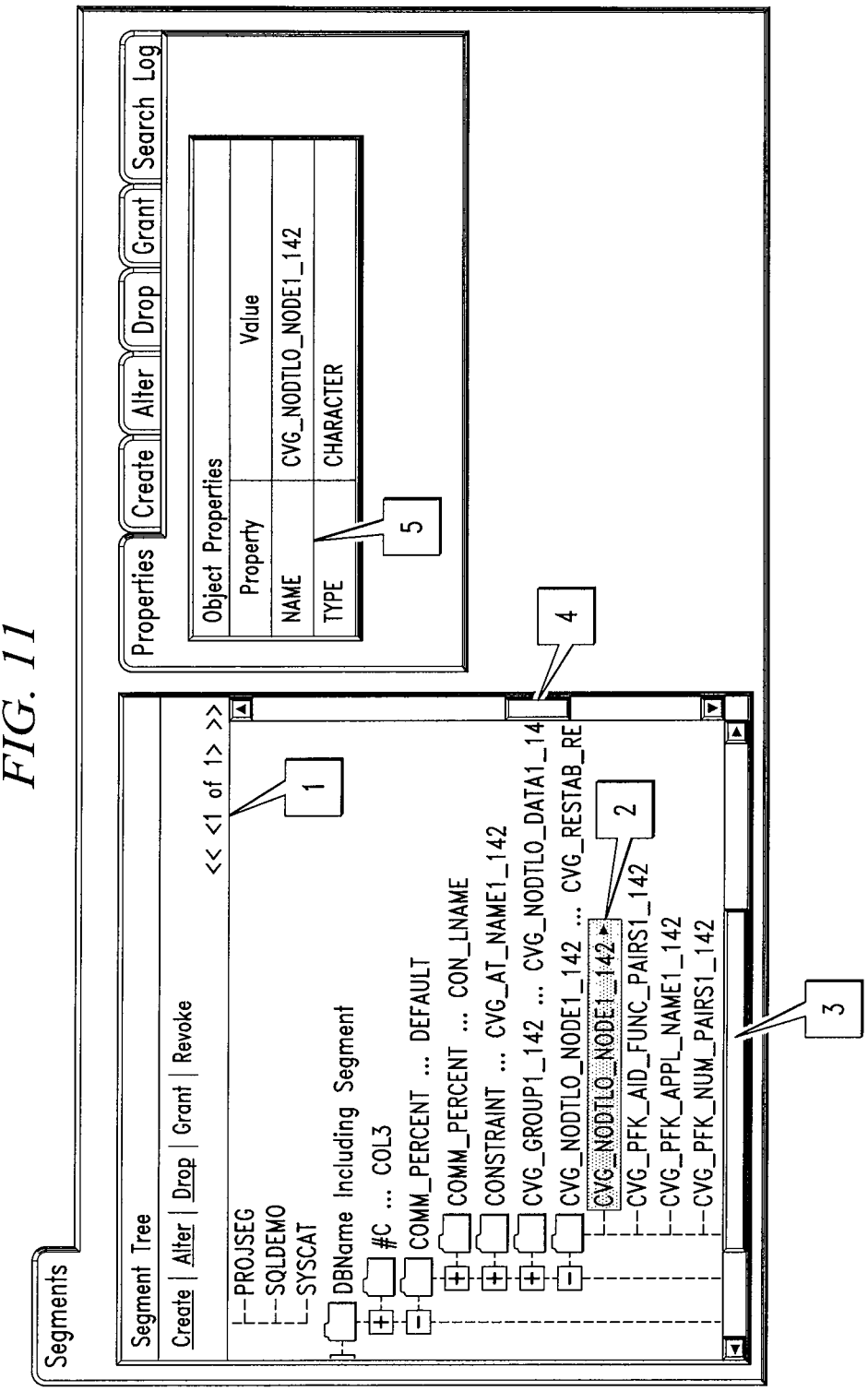

FIG. 11 is an example of a user interface display of Tree User interface state information. The Tree User interface state information is preserved when the user pages away from the HTML Tree Viewer and moves to another page within the viewer. Preserving this state information improves the user experience of interacting with the viewer. The following state information is preserved and presented: 1 the current page number being viewed, 2 the current selected node, 3 the current horizontal scroll position, 4 the current vertical scroll position, and 5 the property page associated with the current selection.

Those of ordinary skill in the art will appreciate that the foregoing discussion of certain embodiments and preferred embodiments is illustrative only, and does not limit the spirit and scope of the present invention, which are limited only by the claims set forth below.

What is claimed is:

1. A method for processing a request to display data, comprising:
   receiving, at a server, a request to display data stored in a database as a graphical representation of a virtual tree structure, the data being associated with at least one selected node of a virtual tree structure, the virtual tree structure comprising a hierarchy of nodes and subnodes, the graphical representation of the virtual tree structure comprising a graphical representation of expandable nodes and subnodes;
   loading at the server node definition data in response to the request, the node definition data defining the selected node of the virtual tree structure, how the selected node expands, and how the selected node is populated with data and subnodes;
   creating, using the node definition data, a tree page image of a portion of the virtual tree structure to be displayed, the tree page image comprising the graphical representation including the selected node;
   saving the tree page image in a page file at the server, the page file including a hidden field;
   saving tree context information in the hidden field in order to facilitate retrieval of the page file, the tree context information indicating a configuration of the portion of the virtual tree structure saved in the page file, wherein the configuration comprises an expansion indicator that indicates whether the page file represents the selected node as expanded or contracted; and
   transmitting, to a client, the saved page file.

2. The method of claim 1, wherein the page file is an XML file.

3. The method of claim 1, wherein the page file is transmitted to a client that is configured to run a web browser application operable to display the data according to the page file.

4. The method of claim 1, wherein the configuration further comprises scroll bar information indicating the position of the saved page file within the overall virtual tree structure.

5. The method of claim 1, further comprising splitting a page file that exceeds a threshold size into one page file corresponding to the selected node and one or more excess page files.

6. The method of claim 5, wherein the threshold size comprises a threshold number of nodes that may be displayed per page.

7. The method of claim 5, wherein the page file is split at a parent node boundary.

8. The method of claim 1, wherein the loading node definition data in response to the request comprises:
   loading a tree application definition file, the tree application definition file comprising the node definition data, wherein the tree application definition file is an XML file; and
   extracting the node definition data from the tree application definition file.

9. A system for processing a request to display data, comprising:
   a client that communicates a request to display data stored in a database as a graphical representation of a virtual tree structure, the data being associated with at least one selected node of a virtual tree structure, the virtual tree structure comprising a hierarchy of nodes and subnodes, the graphical representation of the virtual tree structure comprising a graphical representation of expandable nodes and subnodes; and
   a server communicatively coupled to the client and operable to:
      load node definition data in response to the request, the node definition data defining the selected node of the virtual tree structure, how the selected node expands, and how the selected node is populated with data and subnodes;
      use the node definition data to create a tree page image of a portion of the virtual tree structure to be displayed, the tree page image comprising the graphical representation including the selected node;
      save the tree page image in a page file, the page file including a hidden field;
      save tree context information in the hidden field in order to facilitate retrieval of the page file, the tree context information indicating a configuration of the portion of the virtual tree structure saved in the page file, wherein the configuration comprises an expansion indicator that indicates whether the page file represents the selected node as expanded or contracted; and
      transmit the saved page file to the client.

10. The system of claim 9, wherein the page file is an XML file.

11. The system of claim 9, wherein the client is configured to run a web browser application operable to display the data according to the page file.

12. The system of claim 9, wherein the server is operable to split a page file that exceeds a threshold size into one page file corresponding to the selected node and one or more excess page files.

13. The system of claim 12, wherein the threshold size comprises a threshold number of nodes that may be displayed per page.

14. The system of claim 9, wherein the configuration further comprises scroll bar information indicating the position of the saved page file within the overall virtual tree structure.

15. The system of claim 9, the server further operable to load node definition data in response to the request by:
   loading a tree application definition file, the tree application definition file comprising the node definition data, wherein the tree application definition file is an XML file; and
   extracting the node definition data from the tree application definition file.

16. A system for processing a request to display data, comprising:
- a memory storing node definition data that defines a plurality of nodes in a virtual tree structure and how the plurality of nodes will appear when displayed; and
- a processor operable to:
    - receive a request to display data stored in a database as a graphical representation of a virtual tree structure, the data being associated with at least one selected node of a virtual tree structure, the virtual tree structure comprising a hierarchy of nodes and subnodes, the graphical representation of the virtual tree structure comprising a graphical representation of expandable nodes and subnodes;
    - load node definition data in response to the request, the node definition data defining the selected node of the virtual tree structure, how the selected node expands, and how the selected node is populated with data and subnodes;
    - use the node definition data to create a tree page image of a portion of the virtual tree structure to be displayed, the tree page image comprising the graphical representation including the selected node;
    - save tree page image in a page file in the memory, the page file including a hidden field;
    - save tree context information in the hidden field in order to facilitate retrieval of the page file, the tree context information indicating a configuration of the portion of the virtual tree structure saved in the page file, wherein the configuration comprises an expansion indicator that indicates whether the page file represents the selected node as expanded or contracted; and
    - transmit the saved page file.

17. The system of claim 16, wherein the page file is an XML file.

18. The system of claim 16, wherein the page file is transmitted to a client that is configured to run a web browser application operable to display the data.

19. The system of claim 16, wherein the configuration further comprises scroll bar information indicating the position of the saved page file within the overall virtual tree structure.

20. The system of claim 16, wherein the processor is further configured to split a page file that exceeds a threshold size into one page file corresponding to the selected node and one or more excess page files.

21. The system of claim 20, wherein the threshold size comprises a threshold number of nodes that may be displayed per page.

22. The system of claim 20, wherein the page file is split at a parent node boundary.

23. The system of claim 16, wherein:
- the node definition data stored in the memory comprises a threshold size identifying a threshold number of nodes that may be displayed per page; and
- the processor is further configured to split a page file that exceeds the threshold size into one page file corresponding to the selected node and one or more excess page files.

24. The system of claim 16, the processor further operable to load node definition data in response to the request by:
- loading a tree application definition file, the tree application definition file comprising the node definition data, wherein the tree application definition file is an XML file; and
- extracting the node definition data from the tree application definition file.

* * * * *